United States Patent Office 2,806,871
Patented Sept. 17, 1957

2,806,871

ALKYL ESTERS OF 1-(p-THIOLSULFOPHENYL)-2-ACYLAMIDO-1,3-PROPANEDIOLS AND THEIR PREPARATION

Walter A. Gregory, Wilmington, Del., assignor to E. I. du Pont de Nemours and Company, Wilmington, Del., a corporation of Delaware No Drawing. Application September 24, 1953, Serial No. 382,195

10 Claims. (Cl. 260—453)

This invention relates to alkyl esters of 1-(p-thiolsulfophenyl)-2-acylamido-1,3-propanediols and to a method for preparing them.

This application is a continuation-in-part of my copending application Serial No. 309,735 filed September 15, 1952, now abandoned.

The alkyl esters of 1-(p-thiolsulfophenyl)-2-acylamido-1,3-propanediols of my invention are represented by the formula 1. 

where R is an aliphatic radical of the group consisting of alkyl, allyl, hydroxyethyl and carboxymethyl radicals. Acyl represents a radical such as acetyl, chloroacetyl, bromoacetyl, dichloroacetyl, dibromoacetyl and the like.

Included among the compounds represented by Formula 1, which are preferred, are those wherein R is an alkyl or alkenyl radical having not more than 18 carbon atoms, said alkenyl radical being attached to sulfur thru a methylene group. Still more preferred are compounds of Formula 1 where R is a lower alkyl radical.

For purposes of this invention the aliphatic radical, R, can carry substituent groups. Thus, for example, R can represent β-hydroxyethyl, carboxymethyl and like radicals.

Illustrative of the alkyl esters of 1-(p-thiolsulfophenyl)-2-acylamido-1,3-propanediols of the present invention are:

1 - (p-thiolsulfophenyl) - 2 - (alpha,alpha - dichloroacetamido)-1,3-propanediol, methyl ester
1 - (p-thiolsulfophenyl) - 2 - (alpha,alpha - dichloroacetamido)-1,3-propanediol, ethyl ester
1 - (p-thiolsulfophenyl) - 2 - (alpha,alpha - dichloroacetamido)-1,3-propanediol, n-propyl ester
1 - (p-thiolsulfophenyl) - 2 - (alpha,alpha - dichloroacetamido)-1,3-propanediol, isopropyl ester
1 - (p-thiolsulfophenyl) - 2 - (alpha,alpha - dichloroacetamido)-1,3-propanediol, n-butyl ester
1 - (p-thiolsulfophenyl) - 2 - (alpha,alpha - dichloroacetamido)-1,3-propanediol, isobutyl ester
1 - (p-thiolsulfophenyl) - 2 - (alpha,alpha - dichloroacetamido)-1,3-propanediol, t-butyl ester
1 - (p-thiolsulfophenyl) - 2 - (alpha,alpha - dichloroacetamido)-1,3-propanediol, dodecyl ester
1 - (p-thiolsulfophenyl) - 2 - (alpha,alpha - dichloroacetamido)-1,3-propanediol, beta-hydroxy ester
1 - (p-thiolsulfophenyl) - 2 - (alpha,alpha - dichloroacetamido)-1,3-propanediol, carboxymethyl ester
1 - (p-thiolsulfophenyl) - 2 - (alpha,alpha - dichloroacetamido)-1,3-propanediol, allyl ester
1-(p-thiolsulfophenyl) - 2 - acetamido - 1,3 - propanediol, methyl ester
1-(p-thiolsulfophenyl) - 2 - (alpha-chloroacetamido)-1,3-propanediol, ethyl ester
1-(p-thiolsulfophenyl) - 2 - (alpha,alpha - dibromoacetamido)-1,3-propanediol, methyl ester
1-(p-thiolsulfophenyl)-2-(benzamido) - 1,3 - propanediol, methyl ester The compounds of the invention can be prepared from previously known organic compounds by a novel method which I have discovered.

All of the compounds represented by Formula 1 may exist in optical isomeric form. Stereoisomeric forms used herein refer to the spatial arrangement of the polar groups on the two asymmetric carbon atoms with reference erythrose and threose. To differentiate between these two possible forms the convention will be employed which designates the diastereoisomeric pair related to erythrose in configuration as the erythro form, and the diastereoisomeric pair related to threose as the threo form.

To further designate the threo form of the compounds of the invention, I have designated as the threo form the major product obtained from the aluminum isopropoxide-isopropyl alcohol reduction of the ketones of the formula 2. 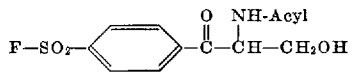

where acyl has the same significance as in Formula 1.

Both the threo and erythro forms exist as racemates of optically active dextro (d) and levo (l) rotatory isomers as well as in the form of the individual or separated dextro (d) and levo (l) optical isomers.

In view of the difficulty of representing the various optical isomers with plane formulas, I have used the customary structural formulas and adopted the following convention in order to designate their optical configuration, and appropriate notation is used under the formula, for example, (l)-threo form, (d)-threo form, (l)-erythro form, (d)-erythro form, (dl)-threo form and the like.

It will be understood that where no notation appears with a structural formula or with a chemical name, the formula or name is to be interpreted in its generic sense; that is, as representing the (d)-threo, (l)-threo isomers or (d)-erythro, (l)-erythro isomers in separated form as well as the (dl)-threo or (dl)-erythro optical racemates. In other words, a formula or name represents not only the unresolved mixture of isomers but also the individual isomers and racemates.

The compounds of the present invention can be prepared by any of several different methods.

My preferred method involves the preparation of an aqueous solution of an alkali metal salt of 1-(p-thiolsulfophenyl)-2-acylamido-1,3-propanediol by reacting 1-(p-fluorosulfonylphenyl)-2-acylamido- 1,3 -propanediol with an aklali metal sulfide such as, for instance sodium sulfide, in an aqueous solution and preferably in the absence of oxygen.

The above reaction proceeds in two steps and may be shown by the following equation:

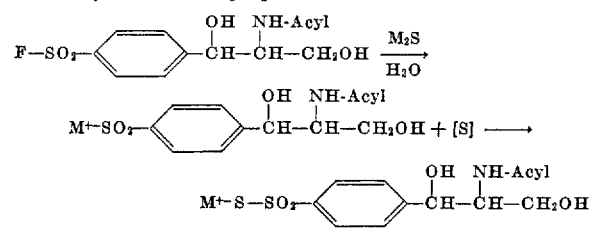

It is preferred to use an excess of the alkali metal sulfide, say, for example, from about 1½ to 3 mols of M₂S for each mol of the 1-fluorosulfonylphenyl-2-acylamido-1,3-propanediol.

The resulting aqueous solution of the alkali metal salt of 1-(p-thiosulfophenyl)-2-acylamido - 1,3 - propanediol is then treated with an appropriate alkylating agent such as alkyl halides, allyl halides, ethylene halohydrins, haloacetic acid salts, or dialkyl sulfates. The amount of alkylating agent used is preferably in excess of the theoretical amount required to react with the 1-p-thiosulfophenyl-2-acylamido-1,3-propanediol.

The alkylation reaction is represented graphically by the following equation:

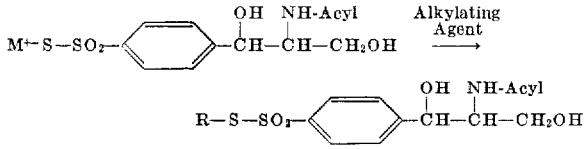

To avoid undesired side reactions the alkylation step is carried out at a temperature in the range from about 10° to 40° C. The alkylating agent may be added in an inert solvent such as dioxane, tetrahydrofuran, dimethyl formamide or an alcohol such as methanol or ethanol.

Alternatively, the compounds of the invention can be prepared by reacting in an inert liquid medium an alkali or alkaline earth metal alkyl mercaptide with (a) 1-(p-fluorosulfonylphenyl)-2-amino-1,3-propanediol having the formula 3. 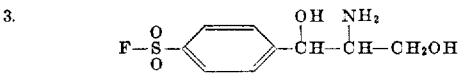

or a salt thereof and acylating the resulting alkyl ester of 1-(p-thiolsulfophenyl)-2-amino-1,3-propanediol, or (b) a 1-(p-fluorosulfonylphenyl-2-acylamido-1,3-propanediol.

The preparation of 1-(p-fluorosulfonylphenyl-2-amino-1,3-propanediol is fully described and claimed in my co-pending application Serial No. 309,734, filed concurrently herewith, now abandoned, a continuation-in-part of which was filed on October 6, 1953, and given Serial No. 384,505. The preparation of a 1-(p-fluorosulfonylphenyl)-2-acylamido-1,3-propanediol, from which 1-(p-fluorosulfonylphenyl-2-amino-1,3-propanediol is obtained, is described and claimed in United States Patent No. 2,680,134.

In brief, the 1-(p-fluorosulfonylphenyl)-2-acylamido-1,3-propanediols are prepared from p-fluoro sulfonylacetophenones of the formula 4. 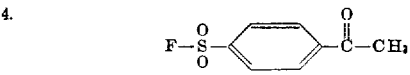

The synthesis involves the following sequence of steps: halogenation, addition of hexamethylenetetramine, treatment with $SO_2$ and water, HCl treatment, acylation, treatment with formaldehyde in the presence of a weak inorganic case, and a Meerwein-Ponndorf-Verly reduction or alternatively a $NaH_4B$ reduction.

Compounds represented by Formula 4 are readily available from either of two types of chemical structures, namely, 5. 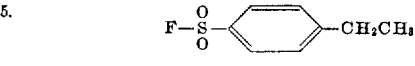

6. 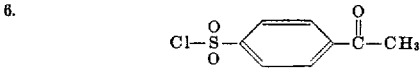

Potassium permanganate and magnesium nitrate may be used to convert a compound of Formula 5 to a compound of Formula 4. Compounds of Formula 6 can be converted to those of Formula 4 by use of potassium fluoride and water.

The conversion of 1-(p-fluorosulfonylphenyl)-2-acylamido-1,3-propanediol to the free amine represented by Formula 3 is described, as already mentioned, in my co-pending application Serial No. 309,734, filed concurrently herewith, now abandoned. This conversion is effected by refluxing an aqueous mixture of a 1-(p-fluorosulfonylphenyl)-2-acylamido-1,3-propanediol corresponding to Formula 3 with hydrochloric acid. This results in the production of the corresponding fluorosulfonylphenyl amino propanediol hydrochloride.

In the alternative and less preferred process employing the free amino compound or a salt thereof it will be understood that care should be exercised to prevent the interaction of the fluorosulfonyl group with the amino group.

The fluorosulfonylphenyl amino propanediol hydrochloride can be reacted in an inert liquid medium with the alkali or alkaline earth metal mercaptide corresponding to the formula 7.      M—(S—R)$_n$ where M is an alkali or alkaline earth metal, $n$ is the valence of the metal M and R has the same significance as in Formula 1 to produce compounds which can be acylated to give the products of this invention corresponding to Formula 1 above. When employing the hydrochloride, two chemical equivalents of the metal mercaptide corresponding to Formula 7 above are employed for each mole of the fluorosulfonylphenyl amino propanediol hydrochloride.

It is preferred to add the fluorosulfonylphenyl amino propanediol hydrochloride in solution or in suspension in an inert liquid medium to a solution of the metal mercaptide in an aliphatic alcohol having no more than four carbon atoms.

When employing the free amine corresponding to Formula 3 above the reaction is most conveniently carried out by neutralizing an aqueous solution of the hydrochloride with, for example, aqueous sodium hydroxide followed by immediate addition of the liberated fluorosulfonylphenyl amino propanediol to a solution of the metal mercaptide in an aliphatic alcohol of no more than four carbon atoms.

The final step of my alternative process involves acylating an alkyl ester of 1-(p-thiolsulfophenyl)-2-amino-1,3-propanediol. Any of a variety of acylating agents may be employed. There may be used, for instance, methyl acetate, methyl chloroacetate, methyl bromoacetate and methyl dibromoacetate. Methyl dichloroacetate is preferred.

The compounds of the present invention are useful as drugs for the control of bacteria and rickettsial infections. They may also find use in the control of viral and fungal infections. The compounds find further use as antibacterial agents and for the control of growth of microorganisms such as yeast and fungi.

In order to better understand the invention, reference should be had to the following illustrative examples:

*Example 1*

Preparation of (dl)-threo-1-(p-thiolsulfophenyl)-2-(alpha,alpha-dichloroacetamido)-1,3-propanediol, methyl ester.

A suspension of 36 g. of (dl)-threo-1-(p-fluorosulfonylphenyl)-2-(alpha,alpha-dichloroacetamido)-1,3 - propanediol in 50 cc. of water containing 36 g. of sodium monosulfide monohydrate is stirred under a nitrogen atmosphere at 30° C. until the solid has dissolved, and then for about 3 hours longer. The solution contains the sodium salt of (dl) - threo - 1 - (p - thiolsulfophenyl)-2-(alpha-alpha-dichloroacetamido)-1,3-propanediol which has the structure:

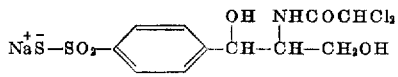

The solution is cooled to 10° C. and 15 g. of dimethyl sulfate is added with good agitation. The temperature of the reaction mixture is kept below 15° C. The reaction is allowed to continue for a period of about one hour. The solution is extracted repeatedly with ethyl acetate. The product crystallizes from the extract after concentrating under reduced pressure. The product is a white crystalline solid and has the formula

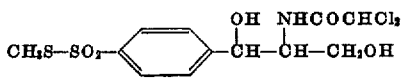

Example 2

(dl)-Threo - 1 - (p-thiolsulfophenyl)-2-(alpha,alpha-dichloroacetamido)-1,3-propanediol, ethyl ester.

A solution of the sodium salt of (dl)-threo-1-(p-thiolsulfophenyl) - 2 - (alpha , alpha - dichloroacetamido)1,3-propanediol is prepared as shown in Example 1. To this solution there is added 22 g. of ethyl iodide with rapid stirring. The temperature of the reaction mixture is maintained between 10–15° C. The reaction is continued for a period of about two hours and the resulting solution is concentrated under reduced pressure. The residue is extracted with boiling ethanol. The product is isolated as white crystals by concentrating the alcohol extract. The product has the formula

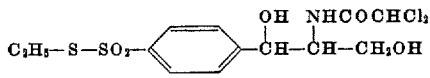

Example 3

Preparation of (dl)-threo-1-(p-thiolsulfophenyl)-2-(alpha,alpha-dichloroacetamido) - 1,3 - propanediol, isopropyl ester.

A solution of the sodium salt of (dl)-threo-1-(p-thiolsulfophenyl) - 2 - (alpha, alpha - dichloroacetamido)-1,3-propanediol is prepared as shown in Example 1.

The solution is cooled to a temperature of 10° C. and 25 g. of isopropyl iodide is then added. The temperature of the reaction mixture is maintained between 10–15° C. for a period of three hours. The solution is stirred vigorously during the three hour period and then is allowed to warm to room temperature. It is stirred for an additional period of two hours.

The solution is concentrated under reduced pressure. The non-volatile residue is extracted with boiling ethanol. The product is obtained from the extracts by concentrating. The product is a white crystalline solid having the following structure:

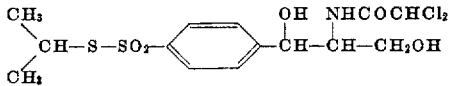

Example 4

Preparation of (dl)-threo - 1 - (p - thiolsulfophenyl)-2-(alpha,alpha-dichloroacetamido) - 1,3 - propanediol, allyl ester.

A solution containing the potassium salt of (dl)-threo-1-(p-thiosulfophenyl)-2-(alpha,alpha-dichloroacetamido)-1,3-propanediol is prepared in a manner similar to that shown in Example 1. This solution is cooled to 10° C. and a solution of 11.4 g. of allyl chloride in 200 cc. of dioxane is added with stirring under a nitrogen atmosphere. The temperature of the reaction mixture is maintained at from 10°–15° C. during the addition of the allyl chloride. Stirring is continued after the addition is complete for a period of about three hours and the solution is then allowed to warm to room temperature. After concentrating the solution under reduced pressure the residue is extracted with hot methanol. The methanol extracts are concentrated to give a white crystalline compound having the structure

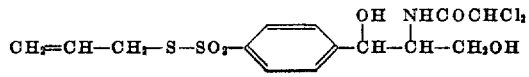

Example 5

(dl)-Threo - 1(p-thiolsulfophenyl) - 2 - (alpha,alpha-dichloroacetamido)-1,3-propanediol, beta-hydroxyethyl ester.

A solution containing the sodium salt of (dl)-threo-1-(p-thiosulfophenyl)-2-alpha,alpha - dichloroacetamido)-1,3-propanediol is prepared as shown in Example 1. This is cooled to 10° C. and 20 g. of ethylene iodohydrin is added slowly. The temperature of the reaction mixture is kept between 10°–15° C. The mixture is stirred for three hours and then warmed to 30° C. and stirred for two hours.

The product is isolated by concentrating the solution under reduced pressure and extracting the residue with hot methanol. The product is a white crystalline solid which has the structure

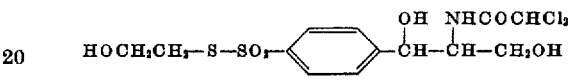

Example 6

Preparation of (dl)-threo - 1 - (p-thiolsulfophenyl)-2-(alpha,alpha-dichloroacetamido) - 1,3 - propanediol, carboxymethyl ester.

A solution of the sodium salt of (dl)-threo-1-(p-thiolsulfophenyl)-2-(alpha,alpha - dichloroacetamido)-1,3-propanediol is prepared as shown in Example 1. After cooling the solution to 10° C. a solution consisting of 20 g. of sodium bromoacetate in 25 cc. of water is added slowly while stirring in a nitrogen atmosphere. The temperature of the reaction mixture is held between 10°–15° C. for a period of three hours, then warmed to 30° C. for a period of one hour.

The solution was concentrated under reduced pressure and the residue diluted with water, made acid with dilute hydrochloric acid and again concentrated. The residue is extracted with hot ethyl acetate.

The product is obtained from the extracts by concentrating under reduced pressure. The product has the following structural formula:

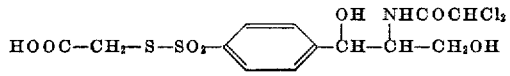

Example 7

Preparation of (dl)-threo-1-(p-thiosulfophenyl)-2-acetamido-1,3-propanediol, methyl ester.

A suspension of 36 g. of (dl)-threo-1-(p-fluorosulfonylphenyl)-2-acetamido-1,3-propanediol in 50 cc. of water containing 36 g. of sodium monosulfide monohydrate is stirred under a nitrogen atmosphere at 30° C. until the solid has dissolved, and then for about 3 hours longer. The solution contains the sodium salt of (dl)-threo - 1 - (p-thiolsulfonyl)-2-acetamido-1,3-propanediol which has the structure:

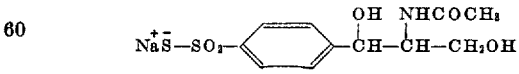

The solution is cooled to 10° C. and 15 g. of dimethyl sulfate is added with good agitation. The temperature of the reaction mixture is kept below 15° C. The reaction is allowed to continue for a period of about one hour. The solution is extracted repeatedly with ethyl acetate.

The product recrystallizes from the extract after concentrating under reduced pressure. The product is a white crystalline solid and has the formula

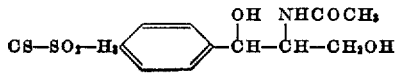

I claim:
1. A compound having the formula

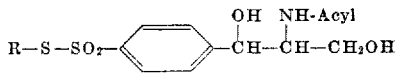

where R is an aliphatic radical of the group consisting of alkyl, allyl, hydroxyethyl and carboxymethyl radicals and acyl is a member of the group consisting of acetyl, chloroacetyl, bromoacetyl, dichloroacetyl and dibromoacetyl radicals.

2. A compound having the formula

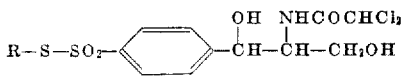

where R is a lower alkyl group.

3. (dl) - Threo - 1 - (p - thiolsulfophenyl) - 2 - (alpha,-alpha-dichloroacetamido)-1,3-propanediol, methyl ester.

4. (dl)-Threo - 1 - (p-thiolsulfophenyl)-2-(alpha,alpha-dichloroacetamido)-1,3-propanediol, ethyl ester.

5. (dl)-Threo - 1 - (p-thiolsulfophenyl)-2-(alpha,alpha-dichloroacetamido)-1,3-propanediol, isopropyl ester.

6. (dl)-Threo - 1 - (p-thiolsulfophenyl)-2-(alpha,alpha-dichloroacetamido) - 1,3-propanediol, beta-hydroxyethyl ester.

7. (dl)-Threo - 1 - (p-thiolsulfophenyl)-2-(alpha,alpha-dichloroacetamido)-1,3-propanediol, allyl ester.

8. In a process for preparing a compound of the formula

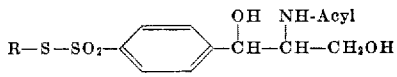

where R is an aliphatic radical of the group consisting of alkyl, allyl, hydroxyethyl and carboxymethyl radicals and acyl is a member of the group consisting of acetyl, chloroacetyl, bromoacetyl, dichloroacetyl and dibromoacetyl radicals, the steps comprising reacting 1-(p-fluorosulfonylphenyl)-2-acylamido-1,3-propanediol with an alkali metal sulfide in an aqueous medium and reacting the resulting alkali metal salt of 1-(p-thiolsulfophenyl)-2-acylamido-1,3-propanediol at a temperature of from about 10 to 40° C. with an alkylating agent of the class consisting of alkyl halides, allyl halides, ethylene halohydrins, haloacetic acid salts, and dialkyl sulfates.

9. In a process for preparing a lower alkyl ester of 1 - (p - thiolsulfophenyl)-2-(alpha, alpha-dichloroacetamido) 1,3-propanediol, the steps comprising reacting 1-(p-fluorosulfonylphenyl)-2-acylamido-1,3 - propanediol with an alkali metal sulfide in the presence of water and alkylating the resulting aqueous solution of the alkali metal salt of 1-(p-thiolsulfophenyl)-2-acylamido-1,3-propanediol with an agent of the class consisting of alkyl halides and dialkyl sulfates at a temperature of from 10° to 40° C.

10. In a process for preparing (dl)-threo-1-(p-thiolsulfophenyl)-2-(alpha,alpha-dichloroacetamido)-1,3 - propanediol, methyl ester, the steps comprising reacting (dl) - threo-1-(p-fluorosulfonylphenyl)-2-(alpha,alpha-dichloroacetamido)-1,3-propanediol with sodium sulfide in the presence of water to produce an aqueous solution of the sodium salt of (dl)-threo-1-(p-thiolsulfophenyl)-2-(alpha,alpha-dichloroacetamido)-1,3-propanediol, and alkylating the latter compound with dimethyl sulfate at a temperature from 10° to 40° C.

References Cited in the file of this patent
UNITED STATES PATENTS 2,483,884   Crooks et al. _____ Oct. 4, 1949

OTHER REFERENCES

Cutler et al.: J. A. C. S., vol. 74, p. 5475 (November 1952). (Received for publication June 2, 1952.)

UNITED STATES PATENT OFFICE
Certificate of Correction

Patent No. 2,806,871 September 17, 1957

Walter A. Gregory

It is hereby certified that error appears in the printed specification of the above numbered patent requiring correction and that the said Letters Patent should read as corrected below.

Column 6, lines 73 to 75, the formula should appear as shown below instead of as in the patent—

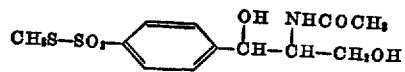

Signed and sealed this 12th day of November 1957.

[SEAL]

Attest:
KARL H. AXLINE,
*Attesting Officer.*

ROBERT C. WATSON,
*Commissioner of Patents.*